United States Patent [19]

Hederich et al.

[11] E Re. 29,577

[45] Reissued Mar. 14, 1978

[54] ANTHRAQUINONE DYESTUFFS

[75] Inventors: Volker Hederich, Cologne; Friedrich Wilhelm Kröck, Opladen; Günter Gehrke, Cologne; Rütger Neeff, Leverkusen, all of Germany

[73] Assignee: Bayer Aktiengesellschaft, Leverkusen, Germany

[21] Appl. No.: 756,707

[22] Filed: Jan. 4, 1977

Related U.S. Patent Documents

Reissue of:

[64] Patent No.: 3,963,763
Issued: Jun. 15, 1976
Appl. No.: 513,485
Filed: Oct. 9, 1974

[30] Foreign Application Priority Data

Oct. 13, 1973 Germany ..... 2351517

[51] Int. Cl.[2] ..... C07C 49/68

[52] U.S. Cl. ..... 260/376; 96/29 D; 260/372; 260/373; 260/374; 260/377; 260/378; 260/380

[58] Field of Search ..... 96/29 D; 260/377, 376, 260/380, 374, 373, 378

[56] References Cited

U.S. PATENT DOCUMENTS

| | | | |
|---|---|---|---|
| 3,192,117 | 6/1965 | Kaiser et al. | 260/380 |
| 3,245,790 | 4/1966 | Downey et al. | 96/29 D |
| 3,491,127 | 1/1970 | Downey et al. | 260/377 |
| 3,682,978 | 8/1972 | Machatzke et al. | 260/377 |
| 3,689,510 | 9/1972 | Kolliker et al. | 260/377 |

*Primary Examiner*—Arthur P. Demers
*Attorney, Agent, or Firm*—Plumley and Tyner

[57] ABSTRACT

Anthraquinone dyestuffs of the formula in which $X_1$ denotes hydroxyl or amino, $X_2$ denotes hydroxyl, amino, alkylamino, cycloalkylamino, arylamino, acylamino, alkylmercapto or arylmercapto, R denotes hydrogen, alkyl, aralkyl, cycloalkyl or aryl, Z denotes alkylene, Ac denotes acyl and Y denotes hydrogen or halogen, and in which the ring A can optionally by substituted by halogen, as well as their preparation and use for the dyeing of synthetic fibre materials. The dyed materials show good fastness to light and sublimation.

5 Claims, No Drawings

ANTHRAQUINONE DYESTUFFS

Matter enclosed in heavy brackets [ ] appears in the original patent but forms no part of this reissue specification; matter printed in italics indicates the additions made by reissue.

The present invention relates to new anthraquinone dyestuffs of the formula

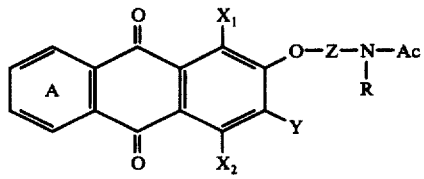

I in which $X_1$ denotes a hydroxyl or amino group, $X_2$ denotes a hydroxyl, amino, alkylamino, cycloalkylamino, arylamino, acylamino, alkylmercapto or arylmercapto group, R denotes hydrogen or an alkyl, aralkyl, cycloalkyl or aryl radical, Z denotes a straight-chain or branched optionally hydroxyl-substituted alkylene radical, Ac denotes an acyl radical and Y denotes hydrogen or halogen and in which the ring A can optionally be substituted by halogen, and processes for their preparation, and their use for dyeing synthetic fibre materials.

Suitable halogen substituents in the ring A are chlorine or fluorine, preferably chlorine in the 6- and/or 7-position.

Suitable alkylamino radicals $X_2$ are those with 1-6 C atoms.

Suitable cycloalkylamino groups $X_2$ are, in particular, cyclohexylamino radicals which are optionally substituted by $C_1$-$C_6$-alkyl radicals.

Suitable arylamino radicals $X_2$ are preferably phenylamino radicals which can be substituted by halogen atoms, $C_1$-$C_8$-alkyl, $C_1$-$C_4$-alkoxy, $C_1$-$C_4$-alkylmercapto, trifluoromethyl, acetylamino, phenyl or phenoxy groups, and the naphthylamine radical.

Suitable acylamino groups $X_2$ are those of the formula

—NH-Q-T in which

Q represents a —CO—, —$CO_2$— or —$SO_2$— bridge and T denotes a $C_1$-$C_{17}$-alkyl radical which is optionally substituted, for example by chlorine, nitrile, hydroxyl or $C_1$-$C_4$-alkoxy, a cyclohexyl radical, or a phenyl radical which is optionally substituted by halogen, such as chlorine and bromine, $C_1$-$C_4$-alkyl, $C_1$-$C_4$-alkoxy or $C_1$-$C_4$-alkylmercapto.

Suitable alkylmercapto groups $X_2$ are preferably those with 1-12 carbon atoms.

Suitable arylmercapto groups $X_2$ are preferably phenylmercapto groups which can be substituted by halogen atoms, $C_1$-$C_4$-alkyl radicals or $C_1$-$C_4$-alkoxy radicals.

Possible alkyl radicals R are: unsubstituted, straight-chain or branched alkyl radicals with 1-9 atoms and $C_1$-$C_4$-alkyl radicals substituted by hydroxyl, nitrile, $C_1$-$C_8$-alkoxy, $C_1$-$C_8$-alkylmercapto, $C_1$-$C_6$-dialkylamino (which may form part of a ring), cyclohexylamino, aryloxy or arylmercapto groups; here, aryl is preferably to be understood as phenyl or naphthyl which are optionally substituted by $C_1$-$C_8$-alkyl, $C_1$-$C_4$-alkoxy, $C_1$-$C_4$-alkylmercapto and halogen.

As examples there may be mentioned: methyl, ethyl, propyl, isopropyl, butyl, isobutyl, tert.-butyl, pentyl, hexyl, octyl, 2-ethyl-hexyl, isooctyl, nonyl, hydroxyethyl, hydroxypropyl, dihydroxypropyl, hydroxybutyl, cyanoethyl, methoxyethyl, isopropoxyethyl, methoxypropyl, ethoxypropyl, butoxypropyl, 2-ethyl-hexoxypropyl, methoxybutyl; methylmercaptoethyl, methylmercaptopropyl, dimethylaminoethyl, diethylaminoethyl, piperidinoethyl, cyclohexylaminoethyl, phenoxyethyl, chlorophenoxyethyl, methylphenoxyethyl, isopropylphenoxyethyl, phenylmercaptoethyl, phenylmercaptopropyl and naphthoxyethyl.

Possible cycloalkyl radicals R are the cyclohexyl and the methylcyclohexyl radical.

As aralkyl radicals R there may be mentioned the benzyl, phenylethyl, chlorophenylethyl, dichlorophenylethyl and phenylpropyl radical.

Suitable aryl radicals R are preferably phenyl radicals which can be substituted by halogen atoms or hydroxyl, $C_1$-$C_8$-alkyl, $C_1$-$C_4$-alkoxy, $C_1$-$C_4$-alkylmercapto, trifluoromethyl, phenyl or phenoxy groups, and the naphthyl radical.

As examples there may be mentioned: phenyl, methylphenyl, ethylphenyl, isopropylphenyl, tert.-butylphenyl, amylphenyl, isooctylphenyl, chlorophenyl, dichlorophenyl, chloromethylphenyl, dichloromethylphenyl, methoxyphenyl, ethoxyphenyl, isopropoxyphenyl, butoxyphenyl, isoamyloxyphenyl, methoxymethylphenyl, methylmercaptophenyl, ethylmercaptophenyl, trifluoromethylphenyl, diphenyl and phenoxyphenyl.

Suitable alkylene radicals Z are those with 2-6 C atoms in the main chain, such as, for example, the ethylene, trimethylene, tetramethylene, pentamethylene, hexamethylene, 1-methyl-ethylene, 1-ethyl-ethylene, 2-hydroxy-propylene, 2,2-dimethyl-ethylene, 2-methyl-2-hydroxymethyl-ethylene and 2,2-dihydroxymethyl-ethylene radical.

Suitable acyl radicals Ac are those of the formula

—U-V in which

U represents a —CO—, —$SO_2$—, —$CO_2$— or —CO—NH— group and in which

V denotes hydrogen or an aliphatic, aromatic or heterocyclic radical, preferably an alkyl or alkenyl radical with 1-17 carbon atoms which is optionally substituted by lower alkoxy or phenoxy groups or by halogen or nitrile, a cycloalkyl radical, or a phenyl or a naphthyl radical which are optionally substituted by halogen, $C_1$-$C_4$-alkyl, $C_1$-$C_4$-alkoxy, $C_1$-$C_4$-alkylmercapto, nitrile, phenyl or cyclohexyl, with the proviso that V can only be hydrogen if U denotes —CO— or —CONH—.

Possible halogen atoms Y are chlorine or bromine.

Preferred dyestuffs of the formula I are those of the formula

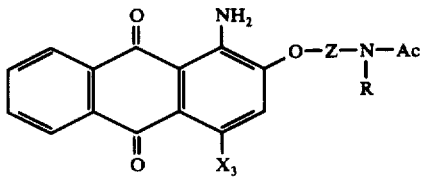

II in which

R, Z and Ac have the abovementioned meaning and $X_3$ presents a hydroxyl, amino, cyclohexylamino or optionally substituted phenylamino group, those dyestuffs of the formula

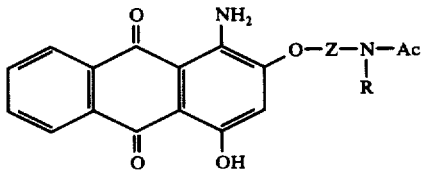

III in which

R, Z and Ac have the abovementioned meaning and those dyestuffs of the formula

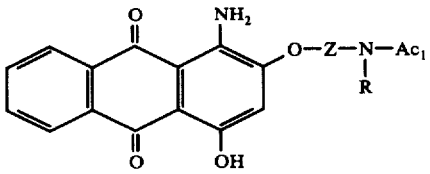

IV in which

R and Z have the abovementioned meaning and $Ac_1$ represents a radical $$-U_1V_1$$

wherein $U_1$ denotes a $-CO_2-$ bridge member and $V_1$ represents a $C_1$-$C_8$-alkyl radical or a phenyl radical which is optionally substituted by chlorine or $C_1$-$C_4$-alkyl radicals.

Amongst these, in turn, dyestuffs of particular industrial interest are those in which R denotes an optionally chlorine-substituted phenyl radical and $Ac_1$ denotes the methoxycarbonyl, ethoxycarbonyl, propoxycarbonyl or isopropoxycarbonyl radical. The new dyestuffs of the formula I are obtained by either a. acylating aminoalkoxyanthraquinones of the formula

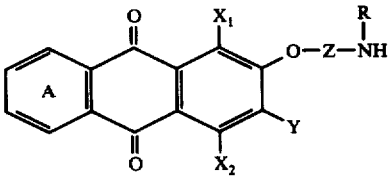

V in which $X_1$, $X_2$, Y, R and Z have the abovementioned meaning and in which the ring A can carry halogen atoms according to methods which are in themselves known, for example in an inert solvent and optionally with the addition of an acid-binding agent, or b) reacting anthraquinone derivatives of the formula

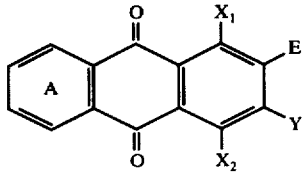

VI in which $X_1$, $X_2$, A and Y have the abovementioned meaning and

E represents a replaceable substituent in the presence of an alkaline condensation agent and optionally in an organic solvent, with compounds of the formula

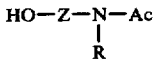

VII in which

R, Z and Ac have the abovementioned meaning.

In the acylation, according to the invention, of the compounds of the formula V, at least 1 equivalent of an acylating agent must be employed per aminoalkoxy group.

The acylation temperatures can be varied within a substantial range. Normally, temperatures of 0° to 200°, preferably 25° to 150° C, are used.

The acyl groups

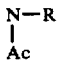

in the new dyestuffs can, very largely, be replaced as desired by other acyl groups, for example by splitting off the acetyl radical hydrolytically from an acetylamino group and reacting the amino group thus liberated with, for example, benzoyl chloride.

Equally, a particular alkylsulphonamide or arylsulphonamide radical $X_2$ can be split hydrolytically in a manner which is in itself known, and the resulting free amino group can again be acylated.

Suitable acylating agents for the acylation of the compounds of the formula V are functional acid derivatives, such as esters, acid anhydrides and acid halides or aliphatic, aromatic and heterocyclic carboxylic acids, sulphonic acid halides, halogenocarbonic acid esters and aliphatic, aromatic and heterocyclic isocyanates.

As examples there may be mentioned the anhydrides, esters or chlorides of formic acid, acetic acid, chloroacetic acid, propionic acid, butyric acid, acrylic acid, pentanecarboxylic acid, hexanecarboxylic acid, heptanecarboxylic acid, decanoic acid, dodecanoic acid, tetradecanoic acid, hexadecanoic acid, octadecanoic acid, crotonic acid, isobutyric acid, 2-methylbutyric acid, trimethylacetic acid, 2-ethylbutyric acid, 2-ethylcaproic acid, coconut fatty acid, methacrylic acid, undecylenic acid, oleic acid, methoxyacetic acid, ethoxyacetic acid, acetoacetic acid, cyanoacetic acid, butoxyacetic acid, cyclohexanecarboxylic acid, benzoic acid, chlorobenzoic acid, methylbenzoic acid, ethylbenzoic acid, p-tert.-butylbenzoic acid, methoxybenzoic acid, ethoxybenzoic acid, dichlorobenzoic acid, phenylbenzoic acid, phenoxybenzoic acid, benzophenonecarboxylic acid, phenoxyacetic acid, phenylacetic acid, β-phenylpropionic acid, cinnamic acid, naphthoic acid, hydroxynaphthoic acid, furanecarboxylic acid, quinolinecarboxylic acid, benzthiazolecarboxylic acid and o-sulphobenzoic acid, thiophenecarboxylic acid, pyrrolecarboxylic acid, pyridenecarboxylic acid, acetoacetic acid, trifluoroacetic acid, p-trifluoromethyl-benzoic acid or 1,2,3,4-tetrachlorobenzoic acid.

Examples of sulphonic acid halides are: methanesulphonyl chloride, methanesulphonyl bromide, ethanesulphonyl chloride, n-propanesulphonyl chloride, n-butanesulphonyl chloride, isopentanesulphonyl chloride, hexanesulphonyl chloride, octanesulphonyl chloride, decanesulphonyl chloride, tetradecanesulphonyl chloride, octadecanesulphonyl chloride, β-methoxyethanesulphonyl chloride, β-ethoxy-ethanesulphonyl chloride, β-butoxy-ethanesulphonyl chloride, N,N-dimethylsulphamic acid chloride, cyclohexanesulphonyl chloride, benzylsulphonyl chloride, benzenesulphonyl chloride, methylbenzenesulphonyl chloride, ethylbenzenesulphonyl chloride, isopropylbenzenesulphonyl chloride, dimethylbenzenesulphonyl chloride, methoxybenzenesulphonyl chloride, ethoxybenzenesulphonyl chloride, butoxybenzenesulphonyl chloride, methylmethoxybenzenesulphonyl chloride, methylmercatobenzenesulphonyl chloride, chlorobenzenesulphonyl chloride, nitrobenzenesulphonyl chloride, dichlorobenzenesulphonyl chloride, bromobenzenesulphonyl chloride, naphthalenesulphonyl chloride, benzthiazolesulphonyl chloride, β-chloroethanesulphonyl chloride, trifluoromethanesulphonyl fluoride and perfluorobutanesulfonyl fluoride.

Examples of halogenoformic acid esters are: chloroformic acid methyl ester, chloroformic acid ethyl ester, chloroformic acid propyl ester, chloroformic acid butyl ester, chloroformic acid amyl ester, chloroformic acid cyclohexyl ester, chloroformic acid benzyl ester and chloroformic acid phenyl ester, chloroformic acid isopropyl ester, chloroformic acid 4-chlorophenyl ester, chloroformic acid 2,4-dichlorophenyl ester or chloroformic acid 4-methoxyphenyl ester.

Examples of isocyanates are: methylisocyanate, ethylisocyanate, propylisocyanate, tetradecylisocyanate, hexadecylisocyante, allylisocyanate, cyclohexylisocyanate, phenylisocyanate, chlorophenylisocyanate, tolylisocyanate, naphthylisocyanate, ethoxyphenylisocyanate, chlorophenoxyphenylisocyanate and methoxymethylisocyanate.

Examples of suitable aminoalkoxyanthraquinones of the formula V are:

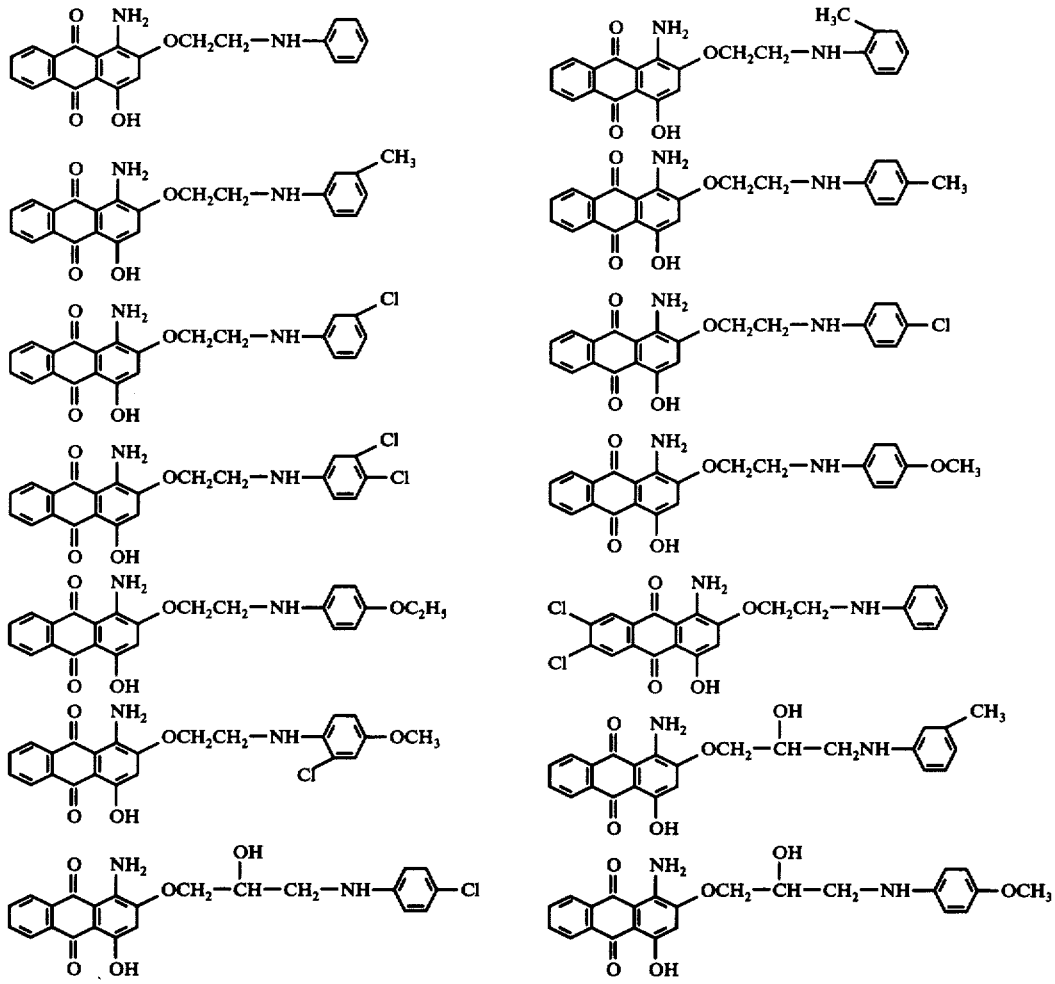

-continued

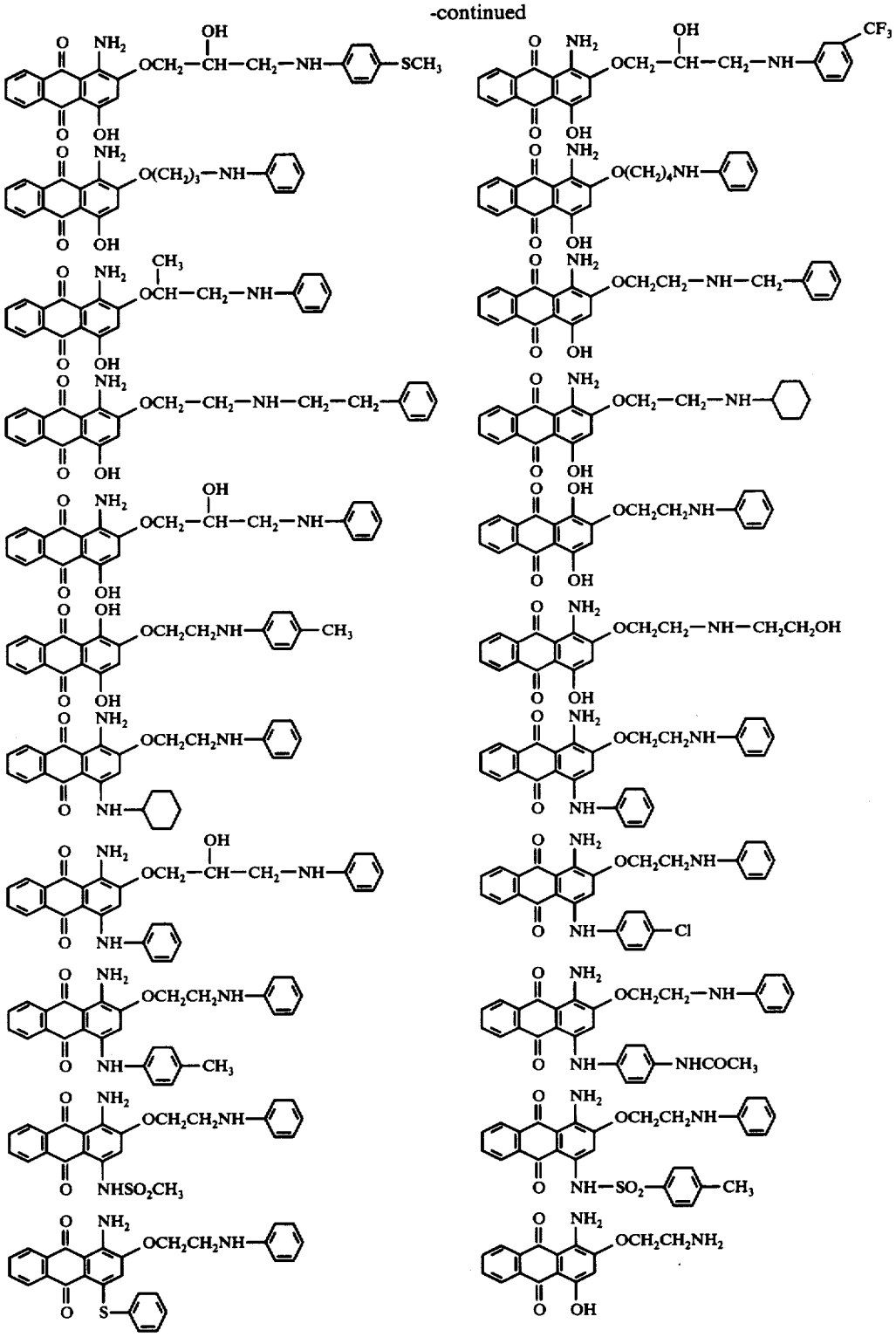

The abovementioned aminolalkoxyanthraquinones are in most cases also new. They are obtained in accordance with the process claimed by reaction of compounds of the formula VI with N-hydroxyalkyl-N-alkylamines or -arylamines or according to the further process claimed by reaction of compounds of the formula VI with acylaminoalcohols of the formula VII, preferably sulphonylaminoalcohols, and subsequent splitting off of the acyl radical.

Suitable solvents for the acylation are, for example, pyridine, methylpyridine, dimethylformamide, dimethylacetamide, dimethylsulphoxide, sulpholane, N-methylpyrrolidone, N-ethylpyrrolidone, ethylene glycol monomethyl ether, nitrobenzene, chlorobenzene, dichlorobenzene or trichlorobenzene.

Suitable acid acceptors for the acylation are sodium acetate or potassium acetate, sodium bicarbonate or potassium bicarbonate, sodium carbonate or potassium carbonate, triethylamine, pyridine or dimethylaniline.

In the preparation, according to the invention, of the new dyestuffs in accordance with process variant b), the anthraquinone derivative VI which carries a replaceable substituent is reacted with at least the equimolar amount, and preferably with an excess, of the substituted acylaminoalcohol, VII, which optionally at the same time serves as a solvent, in the presence of an acid-binding agent, such as sodium carbonate or potassium carbonate, or sodium hydroxide or potassium hydroxide, optionally using an organic solvent, such as pyridine, dimethylformamide, dimethylsulphoxide or N-methylpyrrolidone, at temperatures of 100°–200° C, preferably 120°–170° C, and the reaction product formed is separated out from the reaction medium by means of methanol or ethanol or by pouring the mixture into water.

By replaceable substituents (E) within the scope of the present invention there are understood, for example, halogen atoms, such as chlorine and bromine, $C_1$–$C_4$-alkoxy radicals, optionally substituted phenoxy radicals and the sulphonic acid radical.

Examples of anthraquinone derivatives of the formula VI which carry a replaceable substituent are: 1-amino-2-chloro-4-hydroxy-anthraquinone, 1-amino-2-bromo-4-hydroxyanthraquinone, 1-amino-2-methoxy-4-hydroxy-anthraquinone, 1-amino-2-phenoxy-4-hydroxy-anthraquinone, 1-amino-2-(p-chlorophenoxy)-4-hydroxy-anthraquinone, 1-amino-4-hydroxy-anthraquinone-2-sulphonic acid, 1,4-dihydroxy-2-bromo-anthraquinone, 1,4-dihydroxy-2-phenoxy-anthraquinone, 1-amino-2-bromo-4-mesylamino-anthraquinone, 1-amino-2-bromo-4-benzenesulphonamidoanthraquinone, 1-amino-2-phenoxy-4-(p-tosylamino)-anthraquinone, 1-amino-2-bromo-4-(o-tosylamino)-anthraquinone, 1,4-diamino-2,3-dichloro-anthraquinone, 1,4-diamino-2,3-dibromo-anthraquinone, 1-amino-2-bromo-4-hydroxy-6,7-dichloro-anthraquinone, 1-amino-2-bromo-4-hydroxy-5-chloro-anthraquinone, 1,4-diamino-2-bromo-6,7-dichloro-anthraquinone, 1-amino-2-bromo-4-hydroxy-6,7-difluoro-anthraquinone, 1-amino-4-methylamino-aanthraquinone-2-sulphonic acid, 1-amino-4-butylamino-anthraquinone-2-sulphonic acid, 1-amino-4-cyclohexylamino-anthraquinone-2-sulphonic acid, 1-amino-4-anilino-anthraquinone-2-sulphonic acid, 1-amino-4-(o-toluidino)-anthraquinone-2-sulphonic acid, 1-amino-4-(p-toluidino)-anthraquinone-2-sulphonic acid, 1-amino-4-(p-chloroanilino)-anthraquinone-2-sulphonic acid, 1-amino-4-(2′,4′-dichloro-anilino)-anthraquinone-2-sulphonic acid, 1-amino-4-(2′,4′,6′-trimethyl-anilino)-anthraquinone-2-sulphonic acid, 1-amino-4-(2′,6′-dimethyl-4′-ethyl-anilino)-anthraquinone-2-sulphonic acid, 1-amino-4-(p-anisidino)-anthraquinone-2-sulphonic acid 1-amino-4-(p-phenetidino)-anthraquinone-2-sulphonic acid, 1-amino-4-butylmercapto-anthraquinone-2-sulphonic acid, 1-amino-4-phenylmercapto-anthraquinone-2-sulphonic acid and 1-amino-4-(p-methylphenylmercapto)-anthraquinone-2-sulphonic acid.

Suitable compounds of the formula VII which can be obtained, for example, according to the instructions in Houben-Weyl-Muller, Methoden der org. Chemie (Methods of Organic Chemistry), volume XI/2, page 30; volume XI, page 610 and page 624; volume VIII, page 138, or J. Am. chem. Soc. 70, 438 (1948) or Frdl. 17, 651, are, for example:

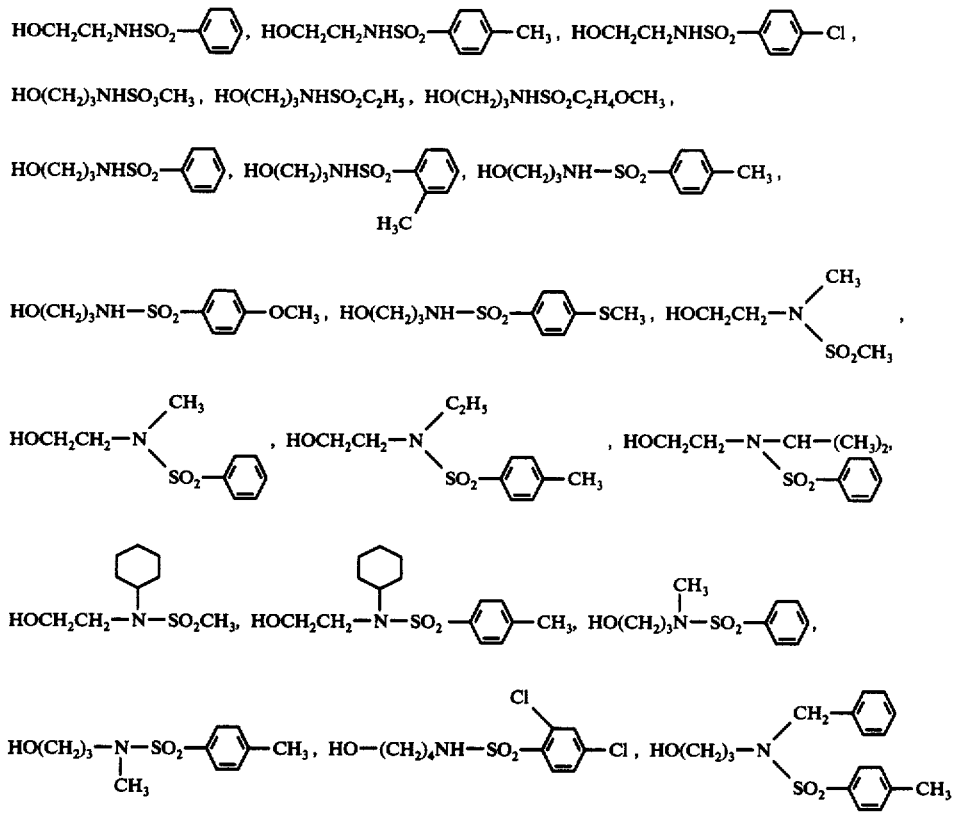

-continued
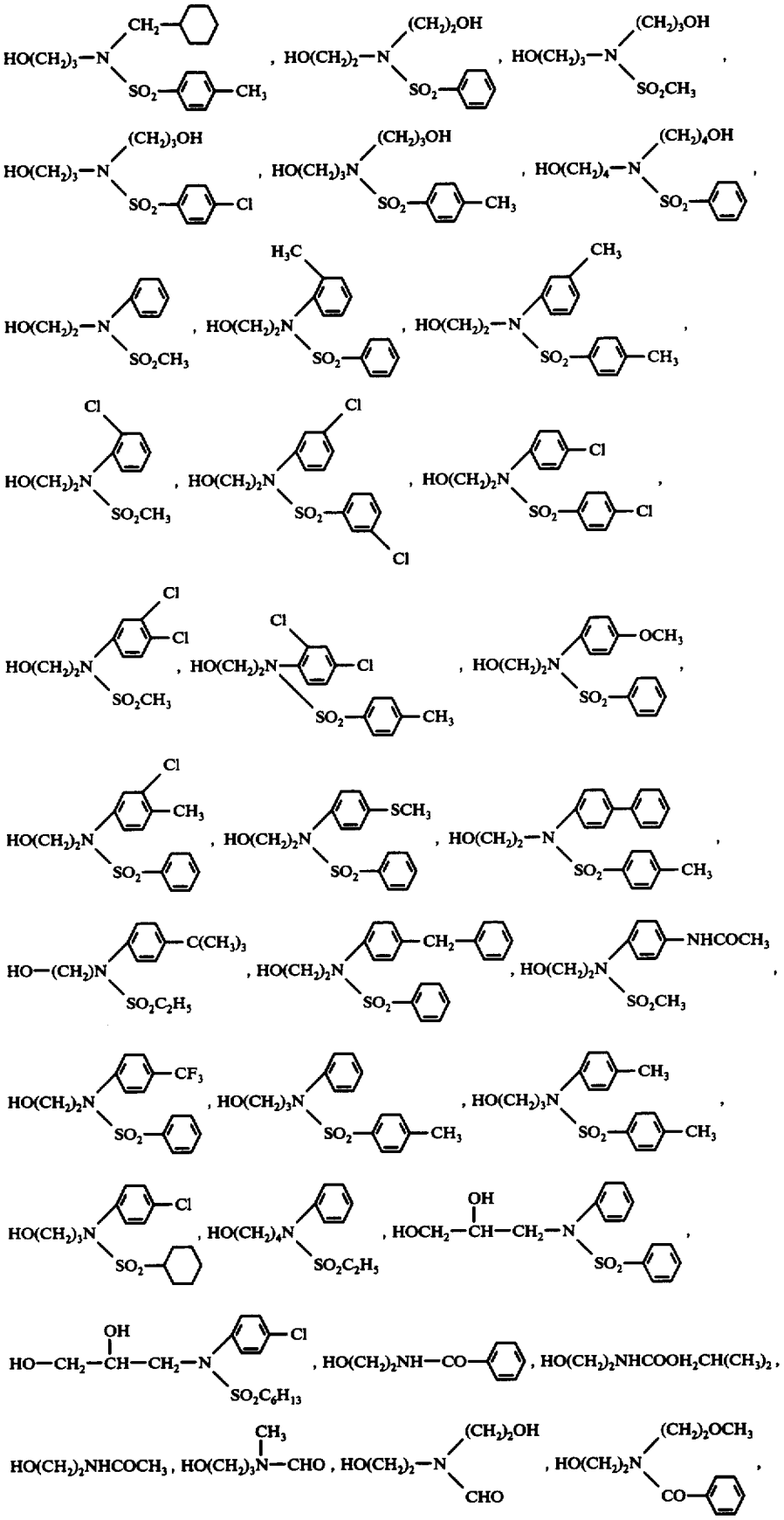

-continued

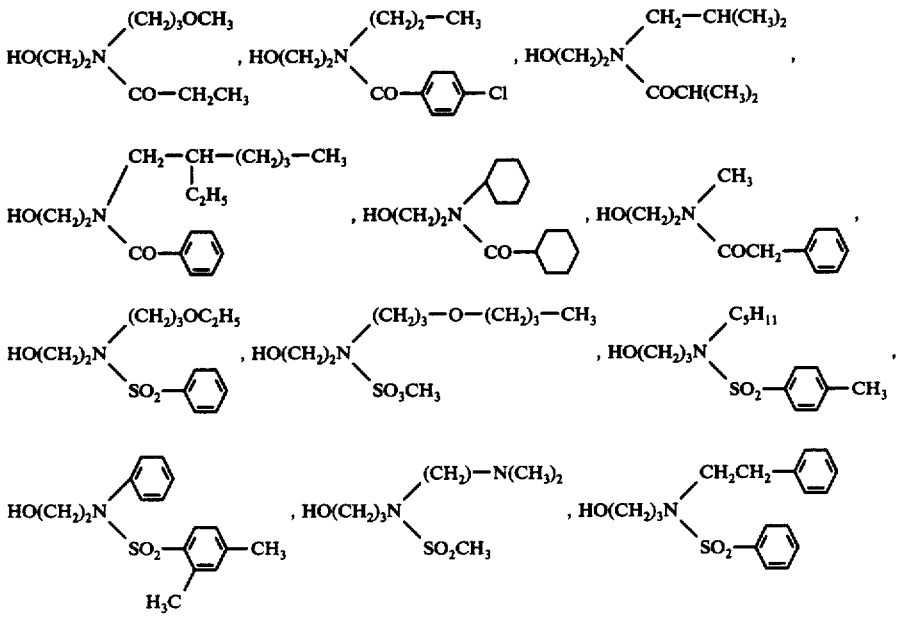

The new dyestuffs of the formula I, optionally also as mixtures with one another, are outstandingly suitable for dyeing and/or printing fibres, filaments, woven fabrics, knitted fabrics, tapes, films or sheets of synthetic origin, but above all for dyeing and printing synthetic fibre materials; for the latter purpose, they are employed in accordance with the aqueous dyeing processes customary for these fibres.

Those dyestuffs of the formula I which, because of hydrophobic groups, especially straight-chain or branched $C_4$–$C_{18}$ carbon chains, in R, Ac or $X_2$ possess good solubility in organic solvents which are water-immiscible and of which the boiling points lie between 40° and 150° C, preferably in aliphatic chlorinated hydrocarbons, such as tetrachloroethylene, trichloroethylene, 1,1,1-trichloroethylene or 1,1,1-trichloropropylene, can be used, optionally also mixed with one another, for the continuous dyeing of synthetic fibre materials from these organic solvents, for example in accordance with the processes of DOS (German Published Specification) No. 1,935,483 (GB 1,274,440).

For this purpose, the dyestuffs to be used according to the invention, in the solid form or in the form of solutions, are dissolved in the water-immiscible organic solvents, if appropriate with addition of known non-ionic auxiliaries. The synthetic fibre materials are impregnated with the dyestuff solutions obtained and the dyestuffs are fixed by heat treatment.

Those dyestuffs of the formula I in which

R denotes a hydrophilic radical, preferably a hydroxyalkyl radical, and

Z denotes a $C_2$–$C_4$-alkylene radical which preferably contains hydroxyl groups can be used, optionally also in the form of mixtures, for dyeing synthetic materials in accordance with the exhaustion process which is in itself known (compare, for example, DOS (German Published Specification) 2,034,264 = BE 769,803) from organic water-immiscible solvents, preferably from aliphatic chlorinated hydrocarbons, such as tetrachloroethylene, trichloroethylene, 1,1,1-trichloroethane or 1,1,1-trichloropropane, wherein these dyestuffs are sparingly soluble.

The dyeing liquors can contain small amounts, that is to say up to 1 per cent by weight, preferably up to 0.5 per cent by weight, of water, based on the weight of the organic solvents, and can optionally contain known non-ionic auxiliaries.

The dyeing according to the invention is carried out in the usual manner in closed apparatuses, the dyestuffs being employed in an amount of 0.01 to 3 per cent by weight based on the weight of the fibre materials. The synthetic fibre materials to be dyed according to the invention are above all fibre materials of polyesters, such as polyethylene terephthalate, polycyclohexanedimethylene terephthalate, heterogeneous polyesters of terephthalic acid, sulphoisophthalic acid and ethylene glycol, or copolyether-ester fibres of p-hydroxybenzoic acid, terephthalic acid and ethylene glycol, cellulose triacetate, cellulose 2½-acetate, and synthetic polyamides obtained from hexamethylenediamine adipate, ε-caprolactam or ω-aminoundecanoic acid, and also fibre materials of polyacrylonitrile and polyurethanes. The fibre materials can be in the most diverse states of processing, for example in the form of filaments, flock, tops, yarn, piece goods, such as woven fabric or knitted fabric, or made-up goods.

The new water-insoluble dyestuffs I can also be used for the spin dyeing or bulk dyeing of polyamides, polyesters and polyolefines in accordance with processes which are in themselves known (compare DOS (German Published Specification) No. 2,037,123).

Using the abovementioned processes, the dyestuffs of the formula I give strong orange-coloured, red or violet dyeings, of good fastness properties, especially good fastness to light, sublimation and thermofixing, on the fibres mentioned.

In the examples which follow, unless otherwise stated, the parts mentioned are parts by weight.

EXAMPLE 1

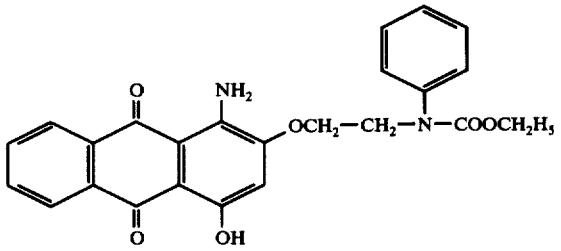

a. 60 parts of 1-amino-4-hydroxy-2-(2-phenylaminoethoxy)-anthraquinone, prepared from 1-amino-4-hydroxy-2-phenoxyanthraquinone and (2-hydroxyethyl)-aniline, are dissolved in 300 parts by volume of N-methylpyrrolidone at 90° C. After cooling to room temperature, a solution of 35 parts of chloroformic acid ethyl ester in 50 parts by volume of N-methylpyrrolidone is added over the course of 20 minutes, the mixture is stirred for 1 hour at room temperature and then for 2 hours at 50° C, and stirring is then allowed to continue for a further 4–5 hours at room temperature. The reaction product is caused to separated out by adding 300 parts by volume of methanol and is filtered off and washed with methanol and water. After drying, 64.3 parts of the compound mentioned are obtained, melting at 115°–6° C after recrystallisation from pyridine.

b. 10 parts of 1-amino-4-hydroxy-2-(2-phenylaminoethoxy)-anthraquinone are dissolved in 40 parts by volume of warm dimethylformamide, the solution is then cooled to room temperature and 5 parts of sodium bicarbonate and 5 parts of chloroformic acid ethyl ester are added. The mixture is stirred at room temperature until no further starting material is detectable. After the usual working up, 10.2 parts of the compound indicated are obtained.

c. 1 part of this dyestuff, which has beforehand been brought to a finely divided state in the presence of dispersing agents, is dispersed in 400 parts of water. 100 parts of polyester fibres (polyethylene terephthalate) are dyed in the resulting dyebath, in the presence of 15 parts of o-cresotic acid methyl ester as a carrier, for 120 minutes at the boil. A clear yellowish-tinged red dyeing of good fastness properties, in particular good fastness to light and to sublimation, is obtained.

EXAMPLE 2

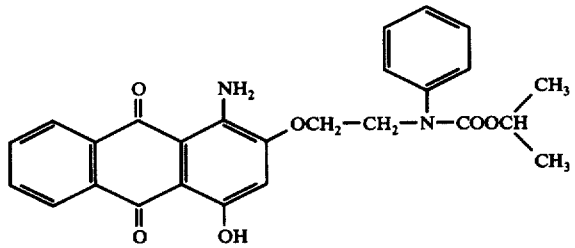

a. 8 parts of 1-amino-4-hydroxy-2-(2-phenylaminoethoxy)-anthraquinone are introduced into 70 parts by volume of N-methylpyrrolidone and 5 parts of chloroformic acid isopropyl ester are added at room temperature. The mixture is stirred for ½ hour at room temperature, 4 parts by volume of pyridine are then added and the dyestuff which has formed is separated out by means of 80 parts by volume of methanol and a little ice. After filtering off and washing with methanol and water, 9.5 parts of the compound indicated are obtained, melting at 126°–7° C after recrystallisation from pyridine.

b. 1 part of this dyestuff, which has beforehand been brought to a finely divided state by means of customary auxiliaries, is used to dye 100 parts of polyester fibres (obtained by polycondensation of terephthalic acid with dimethylolcyclohexane) in 3,000 parts of water for 1 hour at 125°–130° under pressure. A clear red dyeing of good fastness properties is obtained.

EXAMPLE 3

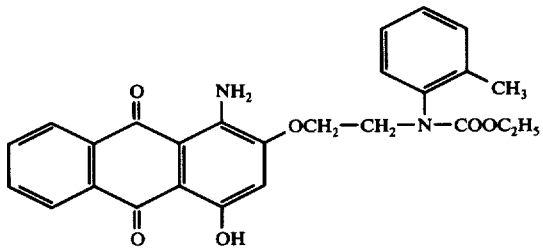

a. 3 parts of chloroformic acid ethyl ester are added to 4 parts of 1-amino-4-hydroxy-2-(2-[2'-methylphenylamino]-ethoxy)anthraquinone in 35 parts of volume of N-methylpyrrolidone. The mixture is stirred for 4 hours at 40°–50° C and thereafter for a further 4–5 hours at room temperature, and after working up in the usual manner 4.3 parts of the compound indicated are obtained, melting at 144°–5° C after recrystallisation from pyridine.

b. 1 part of the above dyestuff, which has beforehand been brought to a finely divided state using the auxiliaries customary for this purpose, 6 parts of fatty alcohol-sulphonate and 3,000 parts of water are used to prepare a dyebath in which a 100 parts of cellulose triacetate fibers are dyed for 1 hour at 100° C. A yellowish-tinged red dyeing of good fastness to washing, thermofixing and light is obtained.

EXAMPLE 4

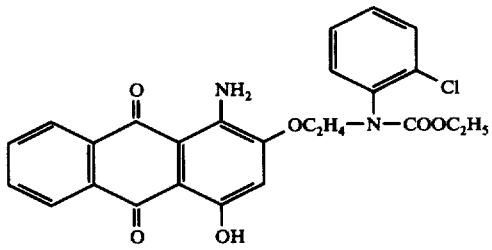

a. 50 parts of 1-amino-4-hydroxy-2-(2-[2'-chlorophenylamino]-ethoxy)-anthraquinone, 350 parts by volume of N-methylpyrrolidone and 40 parts of chloroformic acid ethyl ester are reacted with one another for 10 hours at 40°–50° C. The reaction mixture is then left to stand for 10 hours at room temperature and diluted with 400 parts by volume of methanol and the dyestuff which has separated out is isolated in the usual manner. 53.6 parts of the compound indicated are obtained, melting at 110°–112° C after recrystallisation from glacial acetic acid.

b. A polyethylene terephthalate fabric which has beforehand been purified and heat-set is printed with a paste consisting of the following components: 20 g of dyestuff obtained according to Example 4a, in a finely divided form, 520 g of water, 450 g of 1:2 crystal gum and 10 g of cresotic acid methyl ester.

To fix the dyestuff, the printed and dried goods are treated with hot air at 200° C for 40 seconds. After soaping, rinsing and drying, a clear red print of good fastness to light and to sublimation is obtained.

EXAMPLE 5

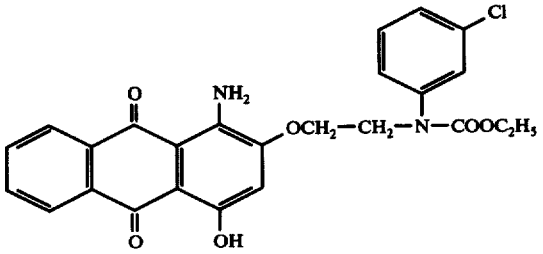

a. A dyestuff is prepared from 5 parts of 1-amino-4-hydroxy-2-(2-[3'-chlorophenylamino]-ethoxy)-anthraquinone and 2.5 parts of chloroformic acid ethyl ester in 35 parts by volume of N-methylpyrrolidone over the course of 1¾ hours at room temperature, and is separated out from the reaction mixture by adding 50 parts by volume of methanol and a little ice. After working up in the usual manner, 5.4 parts of the compound indicated are obtained, melting at 137°-8° C after recrystallisation from perchloroethylene.

b. 1 part of this dyestuff, which has beforehand been brought to a finely divided state by means of the customary auxiliaries, is used to dye 100 parts of polyester fibres (polyethylene terephthalate) in 3,000 parts of water for 1 hour at 125°-130° C under pressure. A strong yellowish-tinged red dyeing of good fastness properties is obtained.

EXAMPLE 6

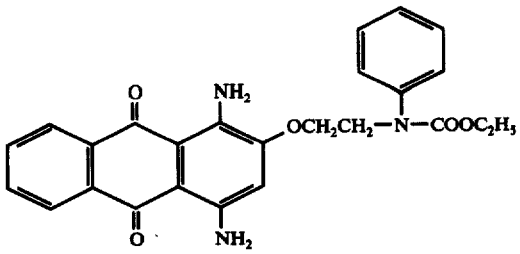

a. 5 parts of 1-amino-4-p-tosylamino-2-(2-phenylamino-ethoxy)-anthraquinone in 40 parts by volume of N-methylpyrrolidone are reacted with 4 parts of chloroformic acid ethyl ester for 2 hours at 25°-30° C. After adding 60 parts by volume of methanol, the dyestuff which has separated out is filtered off and washed with methanol and water. 5.3 parts of 1-amino-4-p-tosylamino-2-(2-N-ethoxycarbonyl-N-phenyl-amino-ethoxy)-anthraquinone are obtained, melting at 161°-2° C after recrystallisation from pyridine.

b. 3.6 parts of the dyestuff obtained according to Example 6a are dissolved in 40 parts by volume of 90% strength sulphuric acid at room temperature. After approx. 10 minutes, the mixture is poured onto 80 parts of ice and the dyestuff which has separated out is filtered off. After washing with water and drying, 2.4 parts of the compound indicated are obtained, melting at 179°-80° C after recrystallisation from pyridine.

c. 1 part of the dyestuff prepared in this way, which has beforehand been brought to a finely divided state in accordance with the customary methods, is used to dye 100 parts of polyamide fabric in 4,000 parts of water for 1 hour at 100° C. The fabric is then rinsed warm and cold and dried. A clear violet dyeing of good fastness to washing and to light is obtained.

EXAMPLE 7

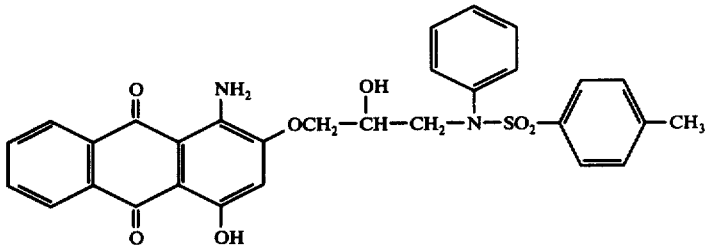

a. 40 parts of 1-amino-4-hydroxy-2-(2-hydroxy-3-phenylaminopropoxy)-anthraquinone, prepared from 1-amino-2-phenoxy-4-hydroxy-anthraquinone and (2,3-dihydroxy-propyl)-aniline, in 300 parts by volume of pyridine are warmed with 30 parts by p-tosyl chloride to 40° C and the mixture is stirred for ¼ hour at this temperature. After cooling, it is diluted with 400 parts by volume of methanol and the dyestuff which has separated out is filtered off. 50.3 parts of the compound indicated are obtained, melting at 203°-4° C after recrystallisation from glacial acetic acid.

b. A fabric of polyester fibres (polyethylene terephthalate) is impregnated on a padder with a liquor which contains, per liter, 20 g of the dyestuff of the above structure, which has beforehand been brought to a finely divided state in the presence of dispersing agents. The fabric is squeezed out to a weight increase of 70% and dried at 100° C. It is then treated wit hot air at 190°-220° C for 60 seconds in order to fix the dyeing, rinsed, washed hot and dried. A strong red dyeing of good fastness to light, sublimation and rubbing is obtained.

EXAMPLE 8

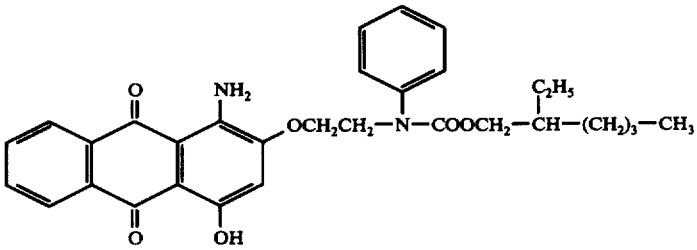

a. 6 parts of 1-amino-4-hydroxy-2-(2-phenylaminoethoxy)anthraquinone in 50 parts by volume of N-methylpyrrolidone are acylated with 5 parts of chloroformic acid ethylhexyl ester for 1 hour at 40°-50° C. After adding 50 parts by volume of ethanol and 40 parts of ice, the reaction mixture is left to stand overnight whilst cooling with ice, the dyestuff which has separated out is filtered off and after washing and drying 7.2 parts of the compound indicated are obtained, melting at 85°-7° C after recrystallisation from pyridine.

b. A fabric of polyethylene terephthalate fibres is impregnated at room temperature with a clear red solution which contains 10 parts of dyestuff according to Example 8a and 7 parts of nonylphenol heptaethylene glycol ether in 983 parts of tetrachloroethylene. After squeezing out to a weight increase of 60%, the fabric is dried for one minute at 80° C. The dyestuff is then fixed by heating the fabric to 190°-220° C for 45 seconds. The small proportion of non-fixed dyestuff is then eluted by brief rinsing with cold tetrachloroethylene. After drying, a clear, yellowish-tinged red dyeing is obtained, which is distinguished by its good build-up and by its good fastness properties.

EXAMPLES 9-38

If the procedure followed is analogous to that indicated in Examples 1-8, the dyestuffs listed in Table 1 are obtained by acylation from the corresponding anthraquinone derivatives; when used in accordance with the dyeing methods indicated in Examples 1-8, the dyestuffs give the shade indicated on polyester materials.

Table 1

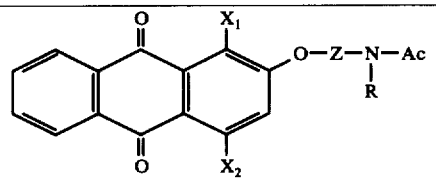

| Example No. | $X_1$ | $X_2$ | Z | R | Ac | m.p. [° C] | Colour shade on PE |
|---|---|---|---|---|---|---|---|
| 9 | $NH_2$ | OH | $-CH_2-CH_2$ | 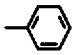 | $-COOCH_3$ | 203-4 | red |
| 10 | " | " | " | " | 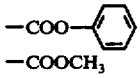 | 148-9 | " |
| 11 | " | " | " | 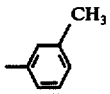 | $-COOCH_3$ | 173-4 | " |
| 12 | " | " | " | " | $-COOC_2H_5$ | 126-7 | " |
| 13 | " | " | " | " | 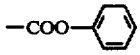 | 193-4 | " |
| 14 | " | " | " | 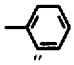 | 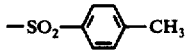 | 209-10 | " |
| 15 | " | " | " | " | 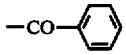 | 203-4 | " |
| 16 | " | " | " | 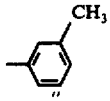 | $-SO_2CH_3$ | 226-7 | " |
| 17 | " | " | " | " | 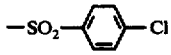 | 224-5 | " |
| 18 | " | " | " | 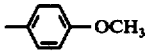 | $-COOC_2H_5$ | 138-9 | " |
| 19 | " | " | " | 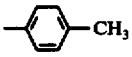 | $-COOC_2H_5$ | 156-7 | " |
| 20 | OH | OH | $-CH_2-CH_2-$ | 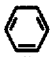 | $-COOC_2H_5$ | 155-6 | orange |
| 21 | " | " | " | " | $-COOCH_3$ | 201-2 | " |

Table 1-continued

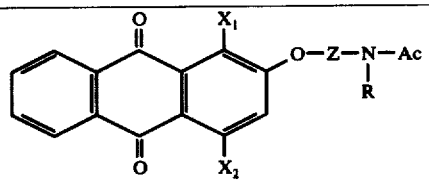

| Example No. | $X_1$ | $X_2$ | Z | R | Ac | m.p. [° C] | Colour shade on PE |
|---|---|---|---|---|---|---|---|
| 22 | " | " | " | " | $-SO_2-$ 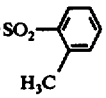 | 162–4 | " |
| 23 | " | " | " | " | $-SO_2-$ 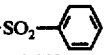 | 119–20 | " |
| 24 | " | " | " | " | $-COCH_3$ | 203–4 | " |
| 25 | " | " | " | " | $-COCH_2CH_3$ | 177–8 | " |
| 26 | $NH_2$ | $NHSO_2$ 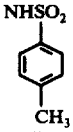 | " | " | $-COOC_2H_5$ | 161–2 | red |
| 27 | " | " | $-CH_2-CH_2-$ | 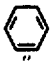 | $-SO_2-$ 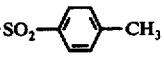 $-CH_3$ | 209–10 | red |
| 28 | " | " | " | " | $-CO-$ 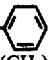 | 201–2 | " |
| 29 | OH | OH | " | " | $-SO_2N(CH_3)_2$ | 130–1 | orange |
| 30 | $NH_2$ | NH- 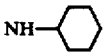 | " | " | $-COOC_2H_5$ | 144–5 | violet |
| 31 | " | " | " | " | $-SO_2-$ 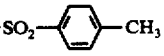 $-CH_3$ | 208–9 | " |
| 32 | " | $NH_2$ | " | " | $-CO-$ 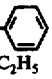 | 229–30 | " |
| 33 | " | NH- 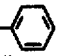 | " | " | $-COOC_2H_5$ | 153–4 | blue-violet |
| 34 | " | " | " | " | $-COOCH_3$ | 201–2 | " |
| 35 | " | OH | " | 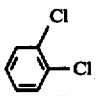 | $-COOC_2H_5$ | 153–4 | red |
| 36 | $NH_2$ | OH | $-CH_2-CH_2-$ | 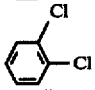 | $-COO-$ 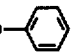 | 186–7 | red |
| 37 | " | " | " | " | $-COOCH_3$ | 188–9 | " |
| 38 | " | " | $CH_2-CH(OH)-CH_2-$ | 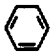 | $-COOC_2H_5$ | 222–3 | " |

EXAMPLE 39

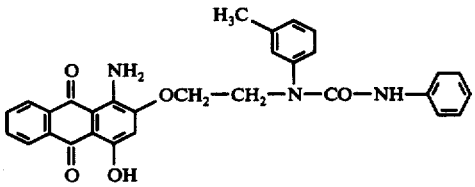

6 parts of 1-amino-4-hydroxy-2-(2-[3-methylphenylamino]-ethoxy)-anthraquinone are suspended in 40 parts by volume of toluene. 2.3 parts of phenylisocyanate and a pinch of triethylenediamine are added to the reaction mixture and the whole is heated to the boil for 5 minutes. The dyestuff formed separates out, after prolonged standing, from the reaction mixture which has cooled. It is filtered off and washed with methanol and water. 7.3 parts of the compound indicated are obtained, melting at 161°–2° C after recrystallisation from pyridine; the compound dyes polyester materials in red shades.

EXAMPLE 40

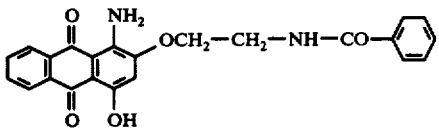

a. 68 parts of benzoic acid methyl ester and 32 parts of ethanolamine are converted into 2-benzoylaminoethanol by heating to 150° C for several hours. 16.6 parts of 1-amino-2-phenoxy-4-hydroxy-anthraquinone and 5.2 parts of potassium carbonate are introduced into the crude reaction product. The mixture is warmed to 140° C and kept at this temperature for approx. 3 hours. After cooling to approx. 80° C, the dyestuff produced is caused to separate out by adding 100 parts by volume of methanol. After working up in the usual manner, 9.4 parts of the compound indicated are obtained.

b. 100 parts of a fibre yarn of polyhexamethylenediamine adipate fibres are introduced, at room temperature, into a dyebath which has been prepared from 1 part of dyestuff according to Example 40a in 1,000 parts of tetrachloroethylene. The bath is heated to 100° C over the course of 20 minutes with vigorous circulation of the liquor, and is kept at this temperature for 45 minutes. The liquor is then separated off and the fabric is rinsed with fresh tetrachloroethylene at 40° C. After separating off the rinsing liquor, the dyed goods are freed from the adhering solvent by centrifuging and drying in a stream of air. A bluish-tinged red dyeing of good fastness properties is obtained, with good dyestuff yield.

EXAMPLE 41

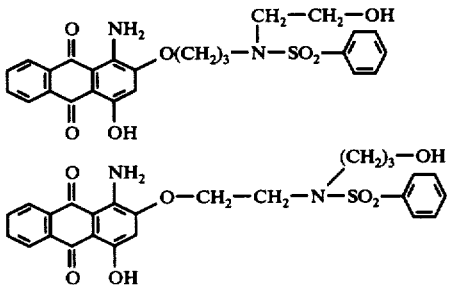

a. 172 parts of N-(3-hydroxypropyl)-benzenesulphamide, 70.5 parts of ethylene carbonate and 2 parts of finely ground potassium carbonate are heated to 200° C for 2 hours. 33.2 parts of 1-amino-2-phenoxy-4-hydroxy-anthraquinone and 8.4 parts of potassium carbonate are introduced into the reaction mixture at approx. 80°-100° C, and the mixture is stirred for approx. 2 hours at 140° C. After cooling to approx. 60° C, 200 parts by volume of methanol are added. After the customary working up, 42.3 parts of the dyestuff mixture indicated are obtained.

b. A fabric of polyester fibres (polyethylene terephthalate) is impregnated on a padder with a liquor which contains, per liter, 20 g of dyestuff of the above structure which has beforehand been brought to a finely divided state in the presence of dispersing agents. The fabric is squeezed out to a weight increase of 70% and is dried at 100° C. It is then treated with hot air at 190°-220° C for 60 seconds to fix the dyeing, rinsed, washed hot and dried. A strong red dyeing of good fastness to light, sublimation and rubbing is obtained.

EXAMPLE 42

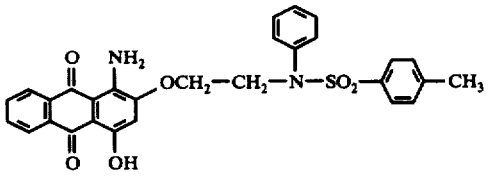

a. 49.4 parts of 4-toluenesulphonic acid anilide, 17.6 parts of ethylene carbonate and 0.5 parts of potassium carbonate are heated to 200° C until the evolution of carbon dioxide has ceased. After cooling to approx. 100° C, 8 parts of 1-amino-2-phenoxy-4-hydroxy-anthraquinone and 2 parts of potassium carbonate are introduced. The mixture is then stirred for 6 hours at 140° C; after cooling, the reaction mixture is diluted with 80 parts by volume of methanol, and after working up in the usual manner 11.2 parts of the compound indicated are obtained.

The dyestuff is identical with that obtained according to Example 14 by acylation, and dyes polyester materials in fast yellowish-tinged red shades.

EXAMPLE 43

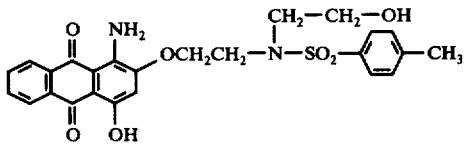

a. 80 parts of N,N-di-(2-hydroxyethyl)-4-tosylamide, 20 parts by volume of N-methylpyrrolidone, 2 parts of potassium hydroxide and 12 parts of 1-amino-2-phenoxy-4-hydroxy-anthraquinone are warmed to 130° C for ½ hour. After cooling to approx. 80° C, the dyestuff is separated out by adding 100 parts by volume of methanol, filtered off and washed with methanol and water. 16.1 parts of the compound indicated are obtained, melting at 191°-2° C after recrystallisation from chlorotoluene.

b. 100 parts of fibre yarn of poly-ε-caprolactam are introduced at room temperature into a dyebath which contains 1 part of dyestuff according to Example 43a in 1,000 parts of tetrachloroethylene. The bath is warmed to 100° C over the course of 20 minutes with vigorous circulation of the liquor and is kept at this temperature for 40 minutes. After this time, the liquor is separated off and the dyed yarn is briefly rinsed with fresh solvent, centrifuged and dried in a stream of air. A clear bluish-tinged red dyeing with good fastness properties and high dyestuff yield is obtained.

If the 1,000 parts of tetrachloroethylene are replaced by the same amount of 1,1,2-trichloroethane, pentachloroethane, 1,2-dichloropropane, 2-chlorobutane, 1,4-dichlorobutane, perfluoro-n-hexane, 1,2,2-trifluoro-trichloroethane, trifluoropentachloropropane, chlorobenzene, fluorobenzene, chlorotoluene or benzotrifluoride or if instead of poly-ε-caprolactam the polyamide of amino-undecanoic acid is used, equivalent red dyeings are obtained.

EXAMPLE 44

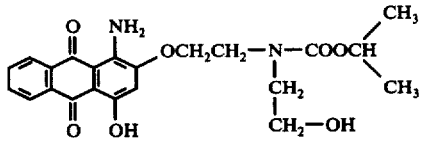

a. A mixture of 50 parts of N,N-di-(2-hydroxyethyl)-isopropylurethane, 8 parts of 1-amino-2-phenoxy-4-hydroxy-anthraquinone and 2.5 parts of potassium carbonate is heated to 140° C for approx. 4 hours. After cooling to 80° C, the mixture is diluted with 80 parts by volume of methanol and the product is filtered off cold. After filtration, and washing with methanol and water, 7.9 parts of the compound indicated are obtained.

b. 50 parts of a fabric of polyester fibres are introduced into a dyebath at room temperature, which has been prepared from 1 part of dyestuff according to Example 44a, 1.5 parts of oleic acid ethanolamide, 1.5 parts of oleyl alcohol eicosaethylene glycol ether, 6 parts of water and 500 parts of tetrachloroethylene.

The bath is heated to 120° C over the course of 10 minutes whilst vigorously circulating the liquor and is kept at this temperature for 45 minutes. After separating off the dyeing liquor, the dyed goods are rinsed with fresh solvent at 40° C and are dried in a stream of air after removing the rinsing liquor. A clear red dyeing of good fastness to light and to sublimation is obtained.

EXAMPLES 45–135

The dyestuffs listed in Table 2, which give the colour shades indicated on polyester materials, are obtained in a similar manner to that described in Examples 40–44.

Table 2

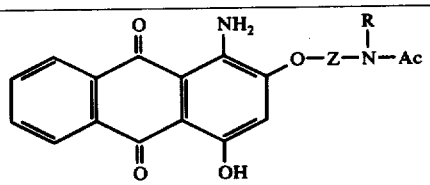

| Example | Z | R | Ac | Colour shade on PE |
|---|---|---|---|---|
| 45 | $-CH_2-CH_2-$ | $CH_3$ | $-CHO$ | yellowish-tinged red |
| 46 | " | H | $-CO-C_6H_4-Cl$ | " |
| 47 | " | H | $-COOCH(CH_3)_2$ | " |
| 48 | $-CH_2-CH_2-CH_2-$ | H | $-CO-CH_2-CH(CH_3)_2$ | " |
| 49 | $-CH_2-CH_2-$ | $CH_2CH_2OH$ | CHO | " |
| 50 | " | $CH_3$ | $-SO_2CH_3$ | pink |
| 51 | " | " | $-SO_2-CH_2-C_6H_5$ | " |
| 52 | " | " | $-SO_2-C_6H_5$ | " |
| 53 | " | " | $-SO_2-C_6H_4-CH_3$ | " |
| 54 | " | " | $-SO_2-C_6H_3(CH_3)-CH_3$ (H3C) | " |
| 55 | " | " | $-SO_2-C_6H_4-Cl$ | " |
| 56 | " | " | $-SO_2-C_6H_3(CH_3)$ (H3C) | " |
| 57 | $-CH_2-CH_2-$ | $-CH_2CH_2OH$ | $-SO_2CH_3$ | pink |
| 58 | " | " | $-SO_2-C_6H_5$ | " |
| 59 | " | " | $-SO_2-C_6H_3(CH_3)-CH_3$ (H3C) | " |
| 60 | " | " | $-SO_2-C_6H_3(CH_3)$ (H3C) | " |
| 61 | " | $-CH_2-CH_2-CH_3$ | $-SO_2CH_3$ | " |
| 62 | " | " | $-SO_2-CH_2-C_6H_5$ | " |
| 63 | " | " | $-SO_2-C_6H_5$ | " |
| 64 | " | $-CH_2CH_2CH_2CH_3$ | $-SO_2-CH_3$ | " |
| 65 | $-CH_2-CH_2-$ | $-CH_2CH_2CH_2CH_3$ | $-SO_2-CH_2-C_6H_5$ | pink |
| 66 | " | " | $-SO_2-C_6H_5$ | " |
| 67 | " | " | $-SO_2-C_6H_4-CH_3$ | " |

Table 2-continued

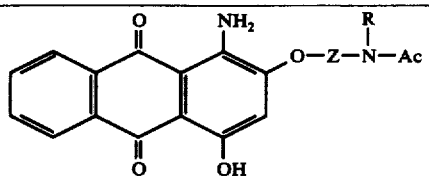

| Example | Z | R | Ac | Colour shade on PE |
|---|---|---|---|---|
| 68 | " | " | $-SO_2-C_6H_4(2\text{-}CH_3)-CH_3$ | " |
| 69 | " | " | $-SO_2-C_6H_4-Cl$ | " |
| 70 | " | " | $-SO_2-C_6H_4(2\text{-}CH_3)$ | " |
| 71 | " | $-CH_2-CH(CH_3)_2$ | $-SO_2-CH_3$ | " |
| 72 | " | " | $-SO_2-CH_2-C_6H_5$ | " |
| 73 | " | " | $-SO_2-C_6H_5$ | " |
| 74 | $-CH_2-CH_2-$ | $CH_2-CH(CH_3)_2$ | $-SO_2-C_6H_4-CH_3$ | pink |
| 75 | " | " | $-SO_2-C_6H_4(2\text{-}CH_3)-CH_3$ | " |
| 76 | " | " | $-SO_2-C_6H_4(2\text{-}CH_3)$ | " |
| 77 | " | $CH_2-CH(C_2H_5)-(CH_2)_3-CH_3$ | $-SO_2CH_3$ | " |
| 78 | " | " | $-SO_2CH_2-C_6H_5$ | " |
| 79 | " | " | $-SO_2-C_6H_5$ | " |
| 80 | " | " | $-SO_2-C_6H_4-CH_3$ | " |
| 81 | $-CH_2-CH_2-$ | $CH_2-CH(C_2H_5)-(CH_2)_3-CH_3$ | $-SO_2-C_6H_4(2\text{-}CH_3)-CH_3$ | pink |
| 82 | " | " | $-SO_2-C_6H_4(2\text{-}CH_3)$ | " |
| 83 | " | $CH_2-C_6H_5$ | $SO_2CH_3$ | " |
| 84 | " | " | $SO_2CH_2-C_6H_5$ | " |
| 85 | " | " | $SO_2-C_6H_5$ | " |
| 86 | " | " | $-SO_2-C_6H_4-CH_3$ | " |
| 87 | " | " | $-SO_2-C_6H_4(2\text{-}CH_3)-CH_3$ | " |
| 88 | " | " | $-SO_2-C_6H_4(2\text{-}CH_3)$ | " |
| 89 | $-CH_2-CH_2-$ | $CH_2-C_6H_{11}$ | $SO_2CH_3$ | pink |
| 90 | " | " | $SO_2-CH_2-C_6H_5$ | " |

Table 2-continued

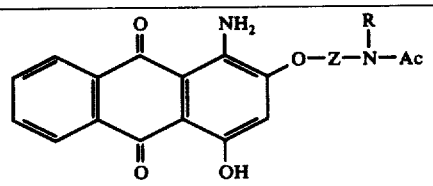

| Example | Z | R | Ac | Colour shade on PE |
|---|---|---|---|---|
| 91 | " | " | $SO_2$—⬡ | " |
| 92 | " | " | $SO_2$—⬡—$CH_3$ | " |
| 93 | " | " | $SO_2$—⬡—$CH_3$ ($H_3C$) | " |
| 94 | " | " | $SO_2$—⬡ ($H_3C$) | " |
| 95 | " | ⬡ | $SO_2CH_3$ | " |
| 96 | " | " | $SO_2$—$CH_2$—⬡ | " |
| 97 | —$CH_2$—$CH_2$— | ⬡ | $SO_2$—⬡—$CH_3$ | pink |
| 98 | " | " | $SO_2$—⬡—$CH_3$ | " |
| 99 | " | " | $SO_2$—⬡—$CH_3$ ($H_3C$) | " |
| 100 | " | " | $SO_2$—⬡ ($H_3C$) | " |
| 101 | " | $CH_2CH_2$—$OCH_3$ | $SO_2CH_2$ | yellowish-tinged red |
| 102 | " | " | $SO_2$—$CH_2$—⬡ | " |
| 103 | " | " | $SO_2$—⬡ | " |
| 104 | —$CH_2CH_2$— | $CH_2CH_2$—$OCH_3$ | $SO_2$—⬡—$CH_3$ | yellowish-tinged red |
| 105 | " | " | $SO_2$—⬡—$CH_3$ ($H_3C$) | " |
| 106 | " | " | $SO_2$—⬡ ($H_3C$) | " |
| 107 | " | $CH_2CH_2CH_2$—$OCH_3$ | $SO_2CH_3$ | " |
| 108 | " | " | $SO_2$—$CH_2$—⬡ | " |
| 109 | " | " | $SO_2$—⬡ | " |
| 110 | " | " | $SO_2$—⬡—$CH_3$ | " |
| 111 | " | " | $SO_2$—⬡—$CH_3$ ($H_3C$) | " |
| 112 | " | " | $SO_2$—⬡ ($H_3C$) | " |
| 113 | " | $CH_2CH_2CH_2$—$OC_2H_5$ | $SO_2CH_3$ | " |

Table 2-continued

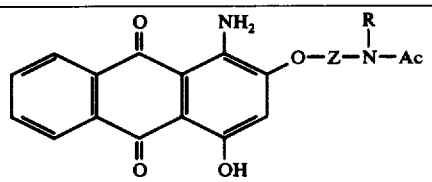

| Example | Z | R | Ac | Colour shade on PE |
|---|---|---|---|---|
| 114 | " | " | $SO_2-CH_2-$ | " |
| 115 | " | " | $SO_2-$ | " |
| 116 | " | " | $SO_2-CH_3$ | " |
| 117 | $-CH_2-CH_2-$ | $CH_2CH_2CH_2-OC_2H_5$ | $SO_2-CH_3$, $H_3C$ | yellowish-tinged red |
| 118 | " | " | $SO_2-$, $H_3C$ | " |
| 119 | " | $(CH_2)_3-O-(CH_2)_3-CH_3$ | $SO_2CH_2$ | " |
| 120 | " | " | $SO_2-CH_2-$ | " |
| 121 | $-CH_2-CH_2-$ | $(CH_2)_3-O-(CH_2)_3-CH_3$ | $SO_2-$ | " |
| 122 | " | " | $SO_2-CH_3$ | " |
| 123 | " | " | $SO_2-$, $H_3C$ | " |
| 124 | " | $(CH_2)_3OCH_2CH(CH_2)_3CH_3$, $C_2H_5$ | $SO_2CH_3$ | pink |
| 125 | " | " | $SO_2-$ | " |
| 126 | $-CH_2-CH_2-$ | $(CH_2)_3OCH_2CH(CH_2)_3CH_3$, $C_2H_5$ | $SO_2-CH_3$ | pink |
| 127 | " | " | $SO_2-$, $H_3C$ | " |
| 128 | $-CH_2CH_2CH_2-$ | H | $SO_2CH_3$ | " |
| 129 | " | " | $SO_2-$ | " |
| 130 | " | " | $SO_2-CH_3$ | " |
| 131 | " | " | $SO_2-$, $H_3C$ | " |
| 132 | " | $CH_2CH_2-OH$ | $SO_2-$, $H_3C$ | " |
| 133 | " | $CH_2$ | $SO_2-$ | " |
| 134 | " | " | $SO_2-CH_3$ | " |
| 135 | " | " | $SO_2-$, $H_3C$ | " |

EXAMPLE 136–189

If a procedure analogous to the instructions in Examples 1–8 or 39–44 is followed, the dyestuffs listed in Table 3 are obtained, which dye polyester materials, in accordance with the dyeing methods described in the above examples, in the shades indicated.

Table 3

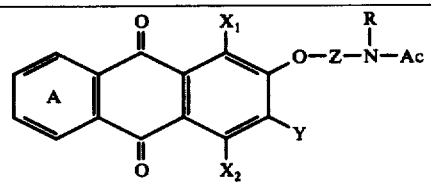

| Ex. | $X_1$ | $X_2$ | A | Y | Z | R | Ac | Colour shade on PE |
|---|---|---|---|---|---|---|---|---|
| 136 | $NH_2$ | OH | — | H | $(CH_2)_2$ | $CH_3$ | CONH—⬡ | Pink |
| 137 | " | " | — | " | " | $C_2H_5$ | CONH—⬡—$CH_3$ | " |
| 138 | " | " | — | " | " | ⬡ | CONH—⬡—Cl | " |
| 139 | " | " | — | " | " | $CH_2$—⬡ | $CONH(CH_2)_{15}CH_3$ | " |
| 140 | " | " | — | " | " | ⬡ | CONH—⬡—$OC_2H_5$ | " |
| 141 | " | $NH_2$ | — | " | $(CH_2)_3$ | $CH(CH_2)_3$ | $COOCH_3$ | Violet |
| 142 | " | " | — | " | " | $CH_2CH_2$—⬡ | $SO_2C_2H_5OCH_3$ | " |
| 143 | " | " | — | " | " | $(CH_2)_2N(CH_3)_2$ | $SO_2$—⬡—$OCH_3$ | " |
| 144 | " | OH | 6,7-Cl | " | $(CH_2)_3$ | $CH_2CH_2OH$ | $COCH_3$ | Red |
| 145 | " | " | 6.7-F | " | " | $CH_3$ | $COC_2H_3$ | " |
| 146 | " | " | 6-F | " | " | " | $COC_3H_2$ | " |
| 147 | " | " | 7-Cl | " | " | " | $COC_4H_3$ | " |
| 148 | " | $NH_2$ | — | Cl | " | ⬡ | $COC(CH_3)_3$ | Violet |
| 149 | $NH_2$ | $NH_2$ | — | Cl | $(CH_2)_2$ | ⬡ | CO—⬡ | Violet |
| 150 | " | " | — | Br | " | " | CO—⬡—$CH_3$ | " |
| 151 | " | " | — | Br | " | " | CO—⬡⬡ | " |
| 152 | " | NH—⬡ | — | H | $(CH_2)_4$ | " | $SO_1C_2H_3$ | blue-violet |
| 153 | " | " | — | " | " | " | $SO_2C_8H_{13}$ | " |
| 154 | " | OH | — | " | $(CH_2)_3$ | H | $COOCH(CH_3)_2$ | red |
| 155 | " | " | — | " | $(CH_2)_3$ | $CH_3$ | " | " |
| 156 | " | " | — | " | $(CH_2)_6$ | H | " | " |
| 157 | " | " | — | " | $(CH_2)_3$ | ⬡ | " | pink |
| 158 | $NH_2$ | OH | — | H | $(CH_2)_2$ | $CH_3$ | $SO_2CF_3$ | pink |
| 159 | " | " | — | " | " | " | $SO_2C_4F_9$ | " |
| 160 | " | ⬡—$SCH_3$ | — | " | $(CH_2)_3$ | H | $COOC_2H_3$ | Violet |
| 161 | " | ⬡—O—⬡ | — | " | " | " | " | " |
| 162 | OH | OH | — | " | $CH_3$<br>—CH—$CH_2$— | $CH_3$ | $SO_2(CH_2)_2CH_3$ | Orange |
| 163 | " | " | — | " | $C_2H_3$<br>—CH—$CH_2$— | " | $CO(CH_2)_3Cl$ | " |
| 164 | " | " | — | " | —$CH_2$—$CH_2$— | $C_2H_3$ | CO—⬡(S) | " |
| 165 | $NH_2$ | NH—⬡($H_3C$) | — | " | " | $(CH_2)_3CH_3$ | COCH=CH—⬡ | Blue-violet |

Table 3-continued

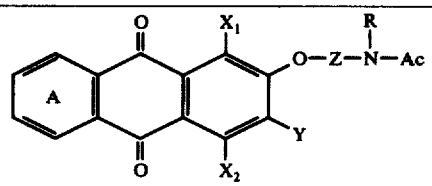

| Ex. | $X_1$ | $X_2$ | A | Y | Z | R | Ac | Colour shade on PE |
|---|---|---|---|---|---|---|---|---|
| 166 | $NH_2$ | NH—(2-$H_3C$-phenyl) | — | H | $CH_2—CH(OH)—CH_2$ | —Cl | $COOC_4H_9$ | Blue-violet |
| 167 | " | NH—(4-Cl-phenyl) | — | " | " | —(phenyl) | $COC(CH_3)_3$ | " |
| 168 | " | " | — | " | " | —($CH_3$-phenyl) | CO—(furyl) | " |
| 169 | " | NH—(4-$OCH_3$-phenyl) | — | " | $—CH_2—CH_3—$ | " | CO—(pyridyl) | " |
| 170 | " | NH—(4-$OC_2H_5$-phenyl) | — | " | $CH_2—C(CH_3)(CH_2OH)—$ | H | $SO_2$—(phenyl) | " |
| 171 | " | NH—(4-$NHCOCH_3$-phenyl) | — | " | $—CH_2—CH_2—$ | H | $SO_2CH_3$ | " |
| 172 | " | $SC_4H_5$ | — | " | " | H | CO—(cyclohexyl) | Bluish-tinged red |
| 173 | " | S—(phenyl) | — | " | " | $C_2H_4OH$ | CO—(4-$OCH_3$-phenyl) | " |
| 174 | $NH_2$ | S—(4-Cl-phenyl) | — | H | $—CH_2—CH_2—$ | $C_3H_4OH$ | $COC_3H_2$ | bluish-tinged red |
| 175 | " | S—(4-$C(CH_3)_3$-phenyl) | — | " | " | " | $COC_3H_2$ | " |
| 176 | " | $NHSO_1CH_3$ | — | " | " | $CH_2$—(phenyl) | $SO_2$—(4-$CH_3$-phenyl) | pink |
| 177 | " | $NHSO_3C_2H_4OCH_3$ | — | " | " | " | $SO_2$—(4-$OC_2H_5$-phenyl) | pink |
| 178 | " | $NHSO_2$—(cyclohexyl) | — | " | " | " | $SO_2$—(naphthyl) | " |
| 179 | " | $NHC_4H_3$ | — | " | " | (cyclohexyl) | $SO_2$—(phenyl) | blue-violet |
| 180 | " | NH—(naphthyl) | — | " | " | " | CHO | " |
| 181 | " | NH—(phenyl)—(phenyl) | — | " | " | " | " | " |
| 182 | " | $NHCOCH_3$ | — | " | $(CH_2)_3$ | (phenyl) | $COCH_3$ | bluish-tinged red |
| 183 | $NH_2$ | $NHCOCH_2CH_3$ | — | H | $(CH_2)_3$ | (phenyl) | $SO_2$—(4-$CH_3$-phenyl) | bluish-tinged red |
| 184 | " | $NHCOCH_2$—(phenyl) | — | " | " | " | " | " |
| 185 | " | $NHCOCH_2CH_2$—(phenyl) | — | " | " | " | " | " |
| 186 | " | NHCO—(phenyl) | — | " | " | $CH_3$ | $SO_2$—(phenyl) | " |
| 187 | " | NHCO—(phenyl)—(phenyl) | — | " | " | " | " | " |

Table 3-continued

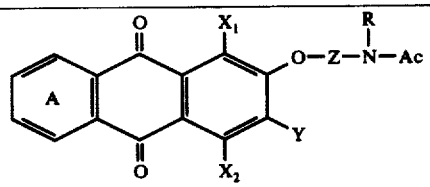

| Ex. | $X_1$ | $X_2$ | A | Y | Z | R | Ac | Colour shade on PE |
|---|---|---|---|---|---|---|---|---|
| 188 | " | OH | — | " | " | " | 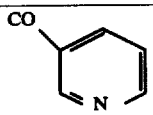 | red |
| 189 | " | " | — | " | " | " | 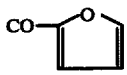 | " |

We claim:

[1. Anthraquinone dyestuffs of the formula

[ 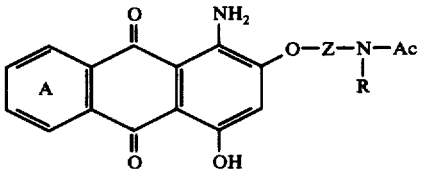 ]

wherein

R comprises hydrogen; unsubstituted straight chain branched alkyl radicals having 1-9 carbon atoms; or $C_1$-$C_4$ alkyl radicals substituted by hydroxyl, nitrile, $C_1$-$C_8$ alkoxy, $C_1$-$C_8$ alkyl mercapto, $C_1$-$C_6$ dialkylamino; cyclohexylamino; phenyloxy wherein the phenyl group is unsubstituted or substituted with $C_1$-$C_8$ alkyl, $C_1$-$C_4$ alkoxy, $C_1$-$C_4$-alkylmercapto or halogen; phenylmercapto wherein the phenyl group is unsubstituted or substituted with $C_1$-$C_8$ alkyl, $C_1$-$C_4$ alkoxy, $C_1$-$C_4$ alkylmercapto, or halogen; napthyloxy, wherein the naphthyl group is substituted or unsubstituted with $C_1$-$C_8$ alkyl, $C_1$-$C_4$ alkoxy, $C_1$-$C_4$ alkyl mercapto, or halogen; or napthylmercapto wherein the napthyl group is substituted or unsubstituted with $C_1$-$C_8$ alkyl, $C_1$-$C_4$ alkoxy, $C_1$-$C_4$ alkylmercapto, or halogen;

Z comprises an alkylene radical having 2-6 carbon atoms in the main chain;

Ac is UV wherein U is —CO—, —$SO_2$—, —$CO_2$— or —CO—NH—, and

V is alkyl or alkenyl having 1-17 carbon atoms unsubstituted or substituted with a lower alkoxy or a phenoxy group or with halogen or with nitrile; cycloalkyl; phenyl; phenyl substituted with halogen, $C_1$-$C_4$ alkyl, $C_1$-$C_4$ alkoxy, $C_1$-$C_4$ alkylmercapto, nitrile, phenyl, or cyclohexyl; napthyl; napthyl substituted with halogen, $C_1$-$C_4$ alkyl, $C_1$-$C_4$ alkoxy, $C_1$-$C_4$ alkylmercapto, nitrile, phenyl, or cyclohexyl; or hydrogen and wherein the nucleus A is not further substituted; with the proviso that V can only be hydrogen if U is —CO— or —CONH—. .]

2. Anthraquinone dyestuffs of claim [1] 6 wherein

U is —$CO_2$— and

V is $C_1$-$C_8$ alkyl or phenyl which is unsubstituted or substituted with chlorine or $C_1$-$C_4$ alkyl.

3. The anthraquinone dyestuff

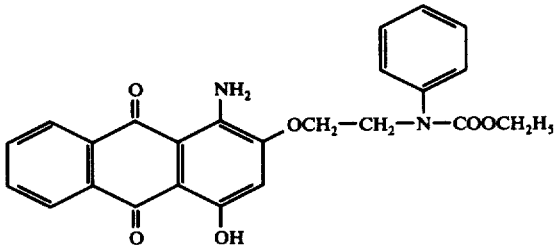

4. The anthraquinone dyestuff

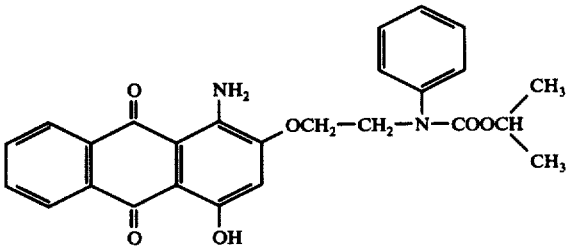

5. The anthraquinone dyestuff

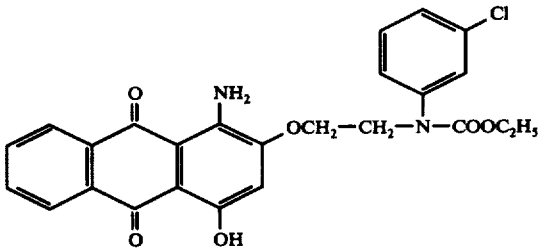

*6. Anthraquinone dyestuffs of the formula*

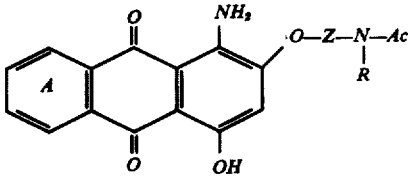

*wherein*

*R comprises hydrogen; unsubstituted straight chain branched alkyl radicals having 1–9 carbon atoms; or $C_1$–$C_4$ alkyl radicals substituted by hydroxyl, nitrile, $C_1$–$C_8$ alkoxy, $C_1$–$C_8$ alkyl mercapto, $C_1$–$C_6$ dialkylamino; cyclohexylamino; phenyloxy wherein the phenyl group is unsubstituted or substituted with $C_1$–$C_8$ alkyl, $C_1$–$C_4$ alkoxy, $C_1$–$C_4$-alkylmercapto or halogen; phenylmercapto wherein the phenyl group is unsubstituted or substituted with $C_1$–$C_8$ alkyl, $C_1$–$C_4$ alkoxy, $C_1$–$C_4$ alkylmercapto, or halogen; napthyloxy, wherein the naphthyl group is substituted or unsubstituted with $C_1$–$C_8$ alkyl, $C_1$–$C_4$ alkoxy, $C_1$–$C_4$ alkyl mercapto, or halogen; or napthylmercapto wherein the napthyl group is substituted or unsubstituted with $C_1$–$C_8$ alkyl, $C_1$–$C_4$ alkoxy, $C_1$–$C_4$ alkylmercapto, or halogen; cyclohexyl; methylcyclohexyl; benzyl; phenylethyl; chlorophenylethyl; dichlorophenylethyl, phenylpropyl; phenyl; phenyl substituted with halogen, hydroxyl, $C_1$–$C_8$-alkyl, $C_1$–$C_4$-alkoxy, $C_1$–$C_4$-alkylmercapto, trifluoromethyl, phenyl, phenoxy; or naphthyl,*

*Z comprises an alkylene radical having 2–6 carbon atoms in the main chain;*

*Ac is UV wherein U is —CO—, —$SO_2$—, —$CO_2$— or —CO—NH—, and*

*V is alkyl or alkenyl having 1–17 carbon atoms unsubstituted or substituted with a lower alkoxy or a phenoxy group or with halogen or with nitrile; cycloalkyl; phenyl; phenyl substituted with halogen, $C_1$–$C_4$ alkyl, $C_1$–$C_4$ alkoxy, $C_1$–$C_4$ alkylmercapto, nitrile, phenyl, or cyclohexyl; napthyl; napthyl substituted with halogen, $C_1$–$C_4$ alkyl, $C_1$–$C_4$ alkoxy, $C_1$–$C_4$ alkylmercapto, nitrile, phenyl, or cyclohexyl; or hydrogen and wherein the nucleus A is not further substituted; with the proviso that V can only be hydrogen if U is —CO— or —CONH—..*

* * * * *